(12) United States Patent
Bender et al.

(10) Patent No.: US 11,144,640 B2
(45) Date of Patent: *Oct. 12, 2021

(54) SECURITY FOR DEVICES CONNECTED TO A NETWORK

(71) Applicant: International Business Machines Corporation, Armonk, NY (US)

(72) Inventors: Michael Bender, Rye Brook, NY (US); Rhonda L. Childress, Austin, TX (US); Marc A. Dickenson, Austin, TX (US); Thomas J. Fleischman, Poughkeepsie, NY (US); Timothy J. Hahn, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/536,409

(22) Filed: Aug. 9, 2019

(65) Prior Publication Data

US 2019/0362071 A1 Nov. 28, 2019

Related U.S. Application Data

(63) Continuation of application No. 15/270,344, filed on Sep. 20, 2016, now Pat. No. 10,460,103.

(51) Int. Cl.
*G06F 21/55* (2013.01)
*H04L 29/06* (2006.01)
*H04W 4/70* (2018.01)

(52) U.S. Cl.
CPC ........ *G06F 21/554* (2013.01); *H04L 63/1425* (2013.01); *H04L 63/1433* (2013.01);
(Continued)

(58) Field of Classification Search
CPC .... G06F 21/554; G06F 21/552; G06F 21/577; G06F 2221/031; H04L 63/1425;
(Continued)

(56) References Cited

U.S. PATENT DOCUMENTS 9,166,999 B1 10/2015 Kulkarni et al.
2007/0044153 A1* 2/2007 Schuba ............... H04L 63/1433
726/24
(Continued)

OTHER PUBLICATIONS

Tanimoto et al., "Risk Management on the Security Problem in Cloud Computing," 2011 First ACIS/JNU International Conference on Computers, Networks, Systems and Industrial Engineering Year: 2011 pp. 147-152.*

(Continued)

*Primary Examiner* — Roderick Tolentino
(74) *Attorney, Agent, or Firm* — Rob Bean; Edell, Shapiro & Finnan, LLC

(57) ABSTRACT

According to one embodiment of the present invention, a system provides security for a device and includes at least one processor. The system monitors a plurality of networked devices for a security risk. Each networked device is associated with a corresponding security risk tolerance. In response to a monitored security risk for one or more of the plurality of networked devices exceeding the corresponding risk tolerance, a network service is initiated to perform one or more actions on each of the one or more networked devices to alleviate the associated security risk. Embodiments of the present invention further include a method and computer program product for providing security to a device in substantially the same manner described above.

20 Claims, 3 Drawing Sheets

(52) U.S. Cl.
CPC .... *H04L 63/1441* (2013.01); *G06F 2221/031* (2013.01); *H04W 4/70* (2018.02)

(58) Field of Classification Search
CPC ............. H04L 63/1441; H04L 63/1433; H04L 63/1416; H04L 63/145; H04L 63/1408; H04L 63/20; H04W 12/128; H04W 12/122; H04W 12/60; H04W 4/70; G06N 20/00
USPC ...................................................... 726/22–25
See application file for complete search history.

(56) References Cited

U.S. PATENT DOCUMENTS

| | | | | |
|---|---|---|---|---|
| 2007/0067847 | A1* | 3/2007 | Wiemer | H04L 63/1433 726/25 |
| 2008/0189788 | A1* | 8/2008 | Bahl | G06F 21/577 726/25 |
| 2010/0275263 | A1* | 10/2010 | Bennett | G06F 21/577 726/25 |
| 2014/0137257 | A1* | 5/2014 | Martinez | H04L 63/1433 726/25 |
| 2014/0173738 | A1* | 6/2014 | Condry | G06F 21/568 726/25 |
| 2015/0128263 | A1* | 5/2015 | Raugas | G06N 7/005 726/23 |
| 2015/0324616 | A1 | 11/2015 | Alarabi | |
| 2015/0341384 | A1* | 11/2015 | Mandayam | H04L 63/1441 726/23 |
| 2016/0173447 | A1 | 6/2016 | Achim et al. | |
| 2016/0182538 | A1* | 6/2016 | Teddy | H04L 63/1408 726/23 |
| 2016/0292599 | A1* | 10/2016 | Andrews | G06Q 10/0635 |
| 2016/0381079 | A1* | 12/2016 | Ben-Shalom | H04L 63/105 726/29 |
| 2017/0078322 | A1* | 3/2017 | Seiver | H04L 41/12 |
| 2018/0082059 | A1 | 3/2018 | Bender et al. | |
| 2018/0129806 | A1 | 5/2018 | Bender et al. | |

OTHER PUBLICATIONS

Brown et al., "Multitenancy—Security Risks and Countermeasures," 2012 15th International Conference on Network-Based Information Systems Year: 2012 pp. 7-13.*
List of IBM Patents or Patent Applications Treated as Related, Aug. 12, 2019, 1 page.

* cited by examiner

SECURITY FOR DEVICES CONNECTED TO A NETWORK

BACKGROUND

1. Technical Field

Present invention embodiments relate to device monitoring and security, and more specifically, to providing security to devices connected to a network.

2. Discussion of the Related Art

Many devices may operate to collect and provide data as output (e.g., portable processing devices, sensors, meters, appliances, vehicles, etc.). These devices may be susceptible to various forms of risks that imperil device operation and/or the integrity of the collected data provided by the device. In order to reduce these risks, security measures may be employed. However, these security measures are de-centralized, thereby being deployed and implemented on each individual device.

SUMMARY

According to one embodiment of the present invention, a system provides security for a device and includes at least one processor. The system monitors a plurality of networked devices for a security risk. Each networked device is associated with a corresponding security risk tolerance. In response to a monitored security risk for one or more of the plurality of networked devices exceeding the corresponding risk tolerance, a network service is initiated to perform one or more actions on each of the one or more networked devices to alleviate the associated security risk.

Thus, a present invention embodiment may provide a centralized approach to provide security as a service to devices connected to a network. This may enable security risks to be monitored and countered. In addition, a security risk tolerance may be specified for a user and/or device to control the types of security risks that may trigger actions, and/or the types of actions which may be performed based on the risks associated with those actions. In other words, the risk tolerance level specifies an amount of risk a user or device is willing to accept or tolerate, and controls when intervening actions are initiated (e.g., based on a degree of risk associated with an identified security risk), and the types of actions that may be performed (e.g., based on risks associated with those actions).

A further aspect of a present invention embodiment is to perform actions to alleviate a security risk including one or more from a group of remediating a monitored security risk, and quarantining one or more networked devices with the monitored security risk exceeding a corresponding security risk tolerance. This is advantageous as a present invention embodiment may not only identify a security risk, but may further perform actions to alleviate or rectify the security risk.

A still further aspect of a present invention embodiment includes consolidating data from other networked devices similar to a networked device of a user, and using the consolidated data to identify the networked devices with a security risk exceeding a corresponding security risk tolerance within a domain of the user. This enables data from other similar devices to be utilized (e.g., patterns among the other similar devices, etc.) to enhance identification of security risks.

Yet another aspect of a present invention embodiment includes consolidating data from each of the plurality of networked devices, and using the consolidated data to identify the networked devices with a security risk exceeding a corresponding security risk tolerance. This enables data from each of the other devices to be utilized (e.g., patterns among each of the other devices) to enhance identification of security risks.

Embodiments of the present invention further include a method and computer program product for providing security to a device in substantially the same manner described above.

BRIEF DESCRIPTION OF THE DRAWINGS

Generally, like reference numerals in the various figures are utilized to designate like components.

DETAILED DESCRIPTION

Figure 1:
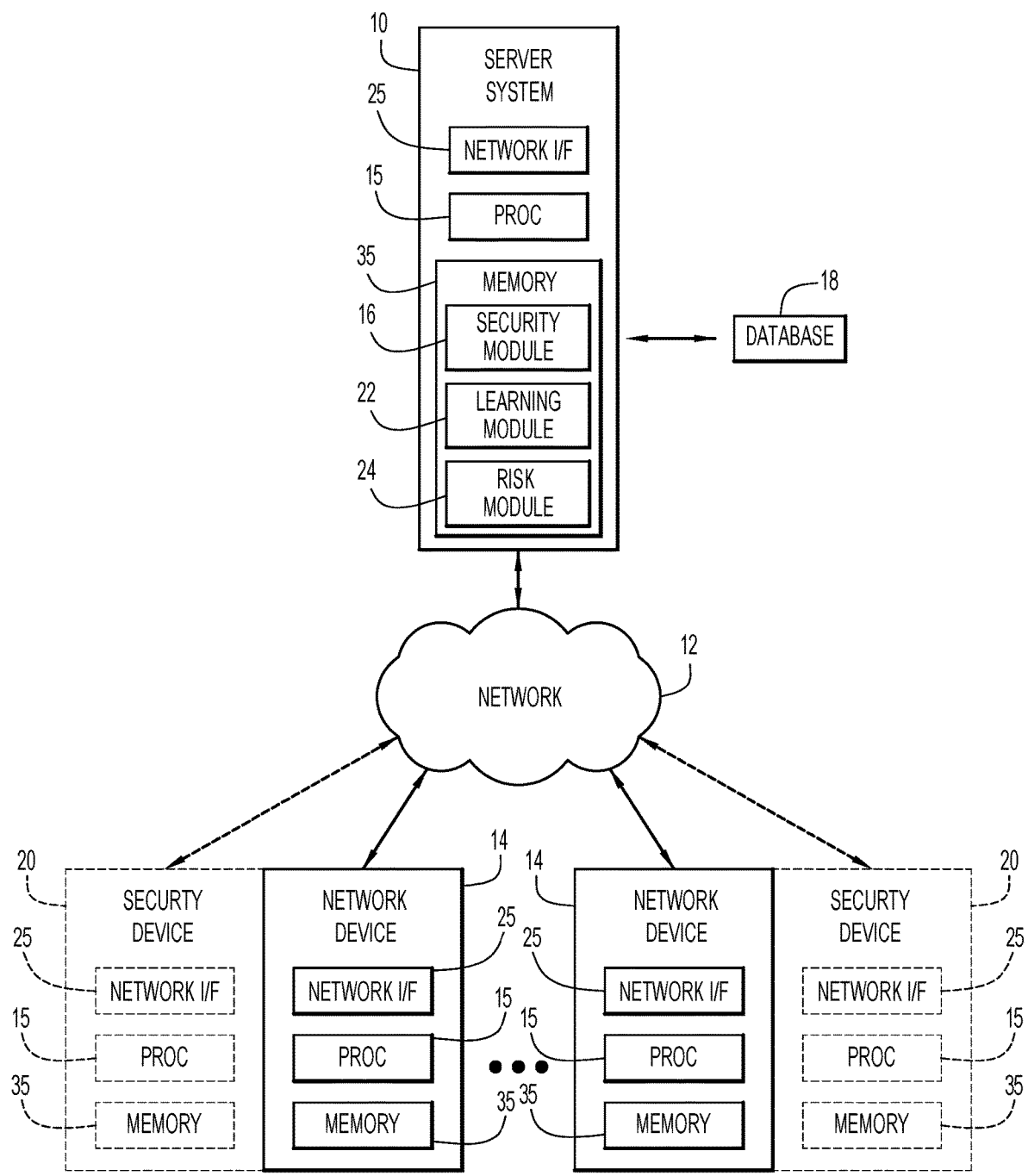
FIG. 1 is an example computing environment according to an embodiment of the present invention.

Present invention embodiments provide security to networked devices (e.g., devices connected to a network (e.g., that may or may not be in communication with each other), etc.). An embodiment of the present invention initiates and orchestrates pinpoint security checks on networked devices in response to any device failing a security check. In this fashion, the networked devices are quickly diagnosed for known attack vectors or other security related issues (e.g., physical damage, abnormal measurements or readings, improper operation, etc.). A present invention embodiment maintains a list of devices being monitored and their device type, and tracks the exposures of the devices to potential security risks.

Security is preferably provided by a present invention embodiment as a service based on a risk tolerance subscribed to by a user (or a device). When a security risk attains the subscribed risk tolerance, various actions may be performed to alleviate the security risk (e.g., quarantining data, applying fixes, suggesting intervention, etc.). The security risk may be identified based on known problems of a particular device, others with similar devices, readings from the particular device outside standard levels or a normal range (e.g. analytics applied on data within a defined number of standard deviations based on other dimensional factors, such as time, weather, etc.), and/or readings from the particular device outside a reliability level of that device or when device accuracy becomes questionable at extreme levels (e.g., some blood glucose meters do not operate well with less than twenty readings, certain devices do not operate well at certain temperatures/humidity, etc.).

Thus, a present invention embodiment may provide a centralized approach to provide security as a service to devices connected to a network. This may enable security risks to be monitored and countered. In addition, a security risk tolerance may be specified for a user and/or device to control the types of security risks that may trigger actions, and/or the types of actions which may be performed based on the risks associated with those actions. In other words, the risk tolerance level specifies an amount of risk a user or device is willing to accept or tolerate, and controls when intervening actions are initiated (e.g., based on a degree of risk associated with an identified security risk), and the types of actions that may be performed (e.g., based on risks associated with those actions).

A further aspect of a present invention embodiment is to perform actions to alleviate a security risk including one or more from a group of remediating a monitored security risk, and quarantining one or more networked devices with the monitored security risk exceeding a corresponding security risk tolerance. This is advantageous as a present invention embodiment may not only identify a security risk, but may further perform actions to alleviate or rectify the security risk.

A still further aspect of a present invention embodiment includes consolidating data from other networked devices similar to a networked device of a user, and using the consolidated data to identify the networked devices with a security risk exceeding a corresponding security risk tolerance within a domain of the user. This enables data from other similar devices to be utilized (e.g., patterns among the other similar devices) to enhance identification of security risks.

Yet another aspect of a present invention embodiment includes consolidating data from each of the plurality of networked devices, and using the consolidated data to identify the networked devices with a security risk exceeding a corresponding security risk tolerance. This enables data from each of the other devices to be utilized (e.g., patterns among each of the other devices) to enhance identification of security risks.

An example computing environment for use with present invention embodiments is illustrated in FIG. 1. Specifically, the computing environment includes one or more server systems 10, and one or more network devices 14. Server systems 10 and network devices 14 may be remote from each other and communicate over a network 12. The network may be implemented by any number of any suitable communications media (e.g., wide area network (WAN), local area network (LAN), Internet, Intranet, etc.). Alternatively, server systems 10 and network devices 14 may be local to each other, and communicate via any appropriate local communication medium (e.g., local area network (LAN), hardwire, wireless link, Intranet, etc.). By way of example only, the computing environment may implement an internet of things (IoT) type environment.

Network devices 14 may include any suitable devices that may sense, collect, and/or provide data (e.g., a sensor (e.g., utility, medical, physiological, weather, alarm, external conditions, device internal conditions, meter, etc.), a device containing a sensor or otherwise collecting data, measurements, and/or readings (e.g., desktop or portable computer system, portable processing device, cellular telephone, appliance, vehicle, medical device, meters, exercise machine or device, etc.), etc.). This data may be stored internally and/or shared across network 12.

The network devices may enable a user to communicate with one or more server systems 10 to register any of the network devices, provide information, and receive results. For example, one or more network devices 14 may be in the form of a client or end-user computer system that may be used to register any of the network devices with one or more server systems 10 for receiving security operations or services. The client system may present a graphical user (e.g., GUI, etc.) or other interface (e.g., command line prompts, menu screens, etc.) to solicit information from users pertaining to the desired security analysis, and may provide reports including analysis results (e.g., results of a security risk analysis, actions performed, etc.).

Network devices 14 may be preferably equipped with at least one CPU or processor 15, one or more memories 35, internal or external network interfaces or communications devices 25 (e.g., transceiver, network cards, etc.)), and/or optional input or output devices (e.g., a keyboard, mouse or other input device, a display, etc.). The network devices may further include any commercially available or custom software and/or hardware modules for the particular device to perform device operations (e.g., applications, browser, communications software, etc.). Network devices 14 may communicate with server systems 10 for security monitoring and processing as described below.

Network devices 14 may alternatively include, or be coupled to, a security device 20 to monitor a corresponding network device and communicate information to server systems 10 to assess a security risk. The security device may similarly be preferably equipped with at least one CPU or processor 15, one or more memories 35, internal or external network interfaces or communications devices 25 (e.g., transceiver, network cards, etc.)), and/or optional input or output devices (e.g., a keyboard, mouse or other input device, a display, etc.). The security devices may further include any commercially available and custom software and/or hardware modules to perform device operations (e.g., applications, communications software, etc.).

The server systems include a security module 16, a learning module 22, and a risk module 24. Security module 16 monitors and provides security operations to network devices 14. Learning module 22 analyzes device manufacturer and other network sites to determine problems and corresponding remediations or fixes for the network devices. Risk module 24 analyzes the information from learning module 22, and determines security risks associated with the problems and corresponding fixes. A database system 18 may store various information for the security analysis (e.g., ranges for device readings, user (or subscriber) information, security tolerances for users/devices, etc.). The database system may be implemented by any conventional or other database or storage unit, may be local to or remote from server systems 10, and may communicate via any appropriate communication medium (e.g., local area network (LAN), wide area network (WAN), Internet, hardwire, wireless link, Intranet, etc.).

Server systems 10 may be implemented by any conventional or other computer systems preferably equipped with a display or monitor, a base (e.g., including at least one CPU or processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, security module 16, learning module 22, risk module 24, etc.).

Security module 16, learning module 22, and risk module 24 may include one or more modules or units to perform the various functions of present invention embodiments described below. The various modules (e.g., security module, learning module, risk module, modules of the network and security devices, etc.) may be implemented by any combination of any quantity of software and/or hardware modules or units, and may reside within memory 35 of the server systems, network devices, and security devices for execution by a corresponding processor 15.

Server systems 10 and security module 16 may provide security as a service to network devices 14. The process software (e.g., security module 16, etc.) is shared, simultaneously serving multiple customers in a flexible, automated fashion. It is standardized, requiring little customization, and it is scalable, providing capacity on demand, preferably in a pay-as-you-go model.

The process software (e.g., security module 16, etc.) can be stored on a shared file system accessible from one or more servers (e.g., of server systems 10). The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The service costs for the security service are preferably based on an amount of time of security coverage for a network device. Alternatively, the measurements of use employed for each service and customer may be sent to a collecting server (e.g., of server systems 10) that sums the measurements of use for each customer for each service that was processed anywhere in the network of servers that provide the shared execution of the process software. The summed measurements of use units are periodically multiplied by unit costs to determine the resulting total process software application service costs. The service costs for the security service are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 2:
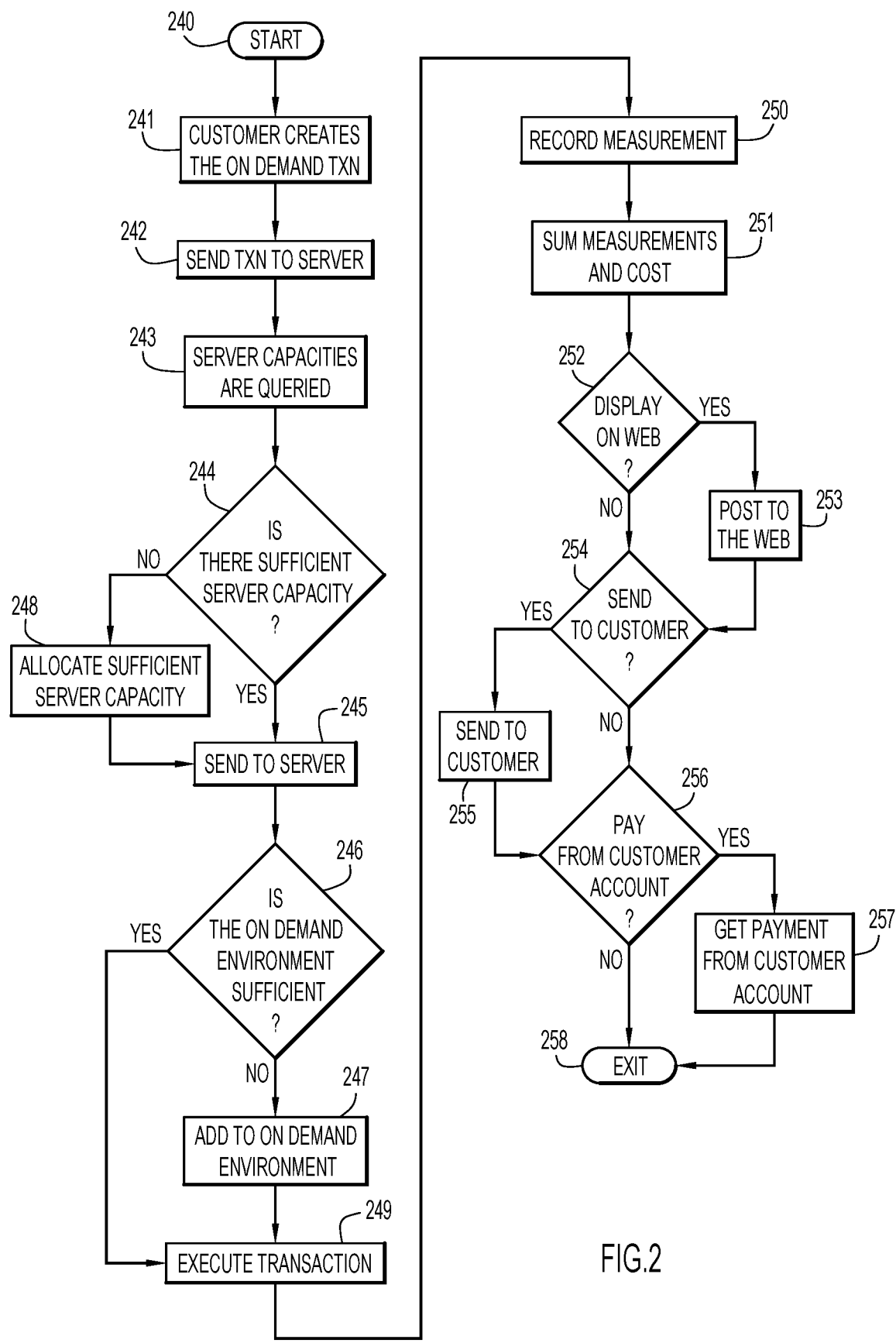
FIG. 2 is a procedural flow chart illustrating a manner of accessing a security service of a present invention embodiment on Demand.

A present invention embodiment may provide security as a service On Demand (e.g., via one or more server systems 10) as illustrated in FIG. 2. Specifically, step 240 begins the On Demand process. A transaction is created at step 241 that contains the unique customer identification, the requested service type, and any service parameters that further specify the type of service. The transaction is then sent to the main server (e.g., of server systems 10) at step 242. In an On Demand environment, the main server can initially be the only server, and then as capacity is consumed other servers (e.g., of server systems 10) are added to the On Demand environment.

The server central processing unit (CPU) capacities in the On Demand environment are queried at step 243. The CPU requirement of the transaction is estimated, and then the server's available CPU capacity in the On Demand environment is compared to the transaction CPU requirement to see if there is sufficient CPU available capacity in any server to process the transaction at step 244. If there is not sufficient server CPU available capacity, then additional server CPU capacity is allocated to process the transaction at step 248. If there was already sufficient available CPU capacity, then the transaction is sent to a selected server (e.g., of server systems 10) at step 245.

Before executing the transaction, a check is made of the remaining On Demand environment at step 246 to determine if the environment has sufficient available capacity for processing the transaction. This environment capacity consists of such things as, but not limited to, network bandwidth, processor memory, storage etc. If there is not sufficient available capacity, then capacity will be added to the On Demand environment at step 247. Next the required software to process the transaction is accessed, loaded into memory, and then the transaction is executed at step 249.

A time-based cost arrangement is preferably utilized, where an amount of coverage is calculated as the time between initiating and terminating coverage, and this may be the only charge to a user or subscriber for the security service. Alternatively, the usage measurements may be recorded at step 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded at step 251. This may be used as an additional or alternative charge to the requesting customer.

If the customer has requested that the On Demand costs be posted to a web site at step 252, then they are posted thereto at step 253. If the customer has requested that the On Demand costs be sent via e-mail to a customer address at step 254, then they are sent at step 255. If the customer has requested that the On Demand costs be paid directly from a customer account at step 256, then payment is received directly from the customer account at step 257. On Demand process proceeds to step 258 and exits.

Figure 3:
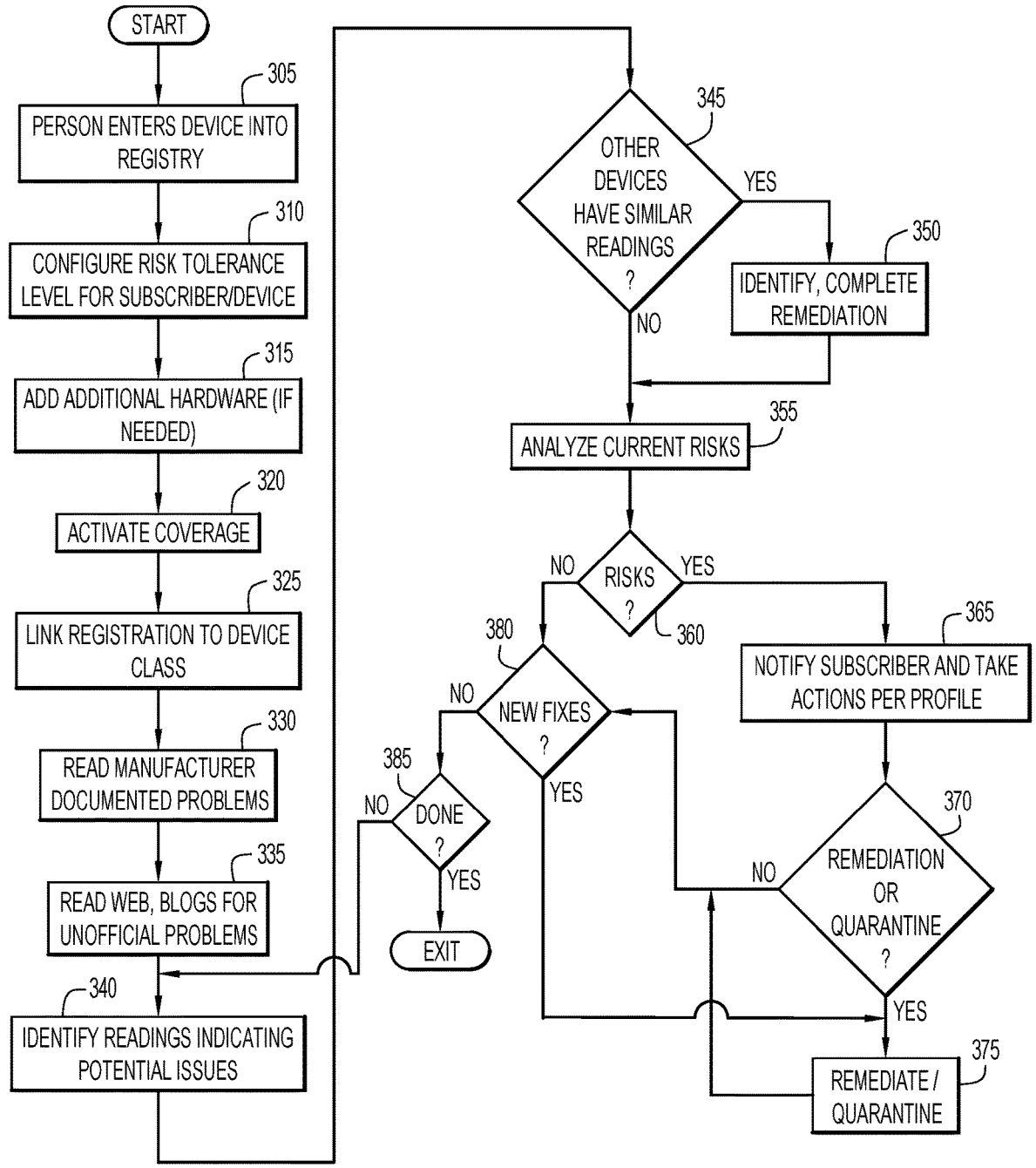
FIG. 3 is a procedural flow chart illustrating a manner of providing security as a service to a device connected to a network according to an embodiment of the present invention.

A manner of monitoring and providing security to networked devices (e.g., via one or more server systems 10, security module 16, learning module 22, and risk module 24) according to an embodiment of the present invention is illustrated in FIG. 3. Initially, a user registers a network device 14 (e.g., via security module 16 and one or more server systems 10) at step 305, and configures one or more risk tolerance levels for the user and/or network device at step 310. These may be accomplished via the network device itself or another device with access to server systems 10. The registration includes providing various information for the user and device (e.g., profile of the user (e.g., name, address, payment information, etc.), profile of the network device (e.g., manufacturer, model, type of device, device configuration (e.g., memory, processor, etc.), age of the device, unique device identifier, preferences for remediation or quarantine, communication information, etc.), etc.). The device is entered into a registry of registered devices (e.g., preferably stored in database system 18), and is identified based on the unique identifier to enable security to be provided to the appropriate networked device.

The risk tolerance levels may each be associated with the user and/or the network device, and include a problem risk level and/or a remediation risk level. For example, a user may indicate a same value for risk tolerance levels (e.g., problem risk level and/or remediation risk level) for each of the user network devices, or specify for each individual user network device the same or different values for the risk tolerance levels (e.g., problem risk level and/or remediation risk level). The problem risk level indicates a degree or level of security risk for the network device that is to be attained before actions may be performed to alleviate or remediate the risk. Generally, a lower problem risk level enables more remediations or actions to be triggered and performed (e.g., identified security risks with lower risk levels may trigger actions, etc.). The remediation risk level indicates a degree or level of risk for performing the remediation or action to alleviate the risk. For example, a trusted or low risk form of remediation includes a software patch or update for a network device provided by the device manufacturer. A medium level risk may include postings on the web about performing certain steps that fix a problem. Generally, a lower remediation risk level enables less remediations or actions to be performed (e.g., only the lower risk or more trusted remediations may be applied, etc.). However, the values for the problem and remediation risk levels may be utilized in any fashion to indicate a degree of risk (e.g., higher values indicate higher risk, lower values indicate lower risk, higher values indicate lower risk, lower values indicate higher risk, etc.).

The user may specify the desired problem and/or remediation risk levels that serve as a threshold to enable security risks to trigger actions and the corresponding actions (or remediations) to be performed as described below. The problem and remediation risk levels may be indicated in any fashion and use any suitable scale. For example, the problem and remediation risk levels may be indicated as a number within any desired numeric range (e.g., 7 on a scale from 1-10), or labels specifying degrees of risk (e.g., low, medium, high, alphanumeric symbols within an alphanumeric range (e.g., A, B, C, etc.)) that may be correlated with numeric or other ranges.

When the network device has insufficient resources to provide readings or measurements to server systems 10 for monitoring and security, or prefers the readings be handled by other (or external) processing to maintain device processing performance, additional hardware (e.g., security device 20) may be provided for the network device at step 315. The security device may enable usage of the security service that permits additional analysis and communications. A profile for the security device may be entered within or in addition to the profile for the network device and include various information to enable communication and usage of the security service (e.g., manufacturer, model, type of security device, security device configuration (e.g., memory, processor, etc.), unique security device identifier (and/or associated network device identifier), communication information, etc.).

Once the network device is registered, the security coverage is activated at step 320. This may be accomplished (e.g., via security module 16 and one or more server systems 10) in response to establishing communication with the network device (or associated security device 20), a command from the user, and/or payment received from the user to initiate the security service.

When the coverage is activated, the registration is linked to a network device class (e.g., via risk module 24 and one or more server systems 10) based on the network device information at step 325. This enables a security risk to be assessed based on the various types of devices as described below.

Problems and remediations associated with the network devices that are documented by device manufacturers are analyzed (e.g., via learning module 22 and one or more server systems 10) at step 330. The manufacturer information may be obtained from various sources of information on the network (e.g., device user manual, manufacturer web or other site, etc.). In addition, information concerning problems and remediations associated with the network devices may be obtained from various other sources (e.g., web blogs, threads, forums, chats, etc.) and analyzed at step 335. The information from the device manufacturers and other information sources is preferably analyzed to identify problems and remediations for the network device classes. The classes may group the network devices in any manner or granularity (e.g., individual network devices, device model types, device categories, device manufacturers, device age, etc.). The problems may each be associated with any quantity of (e.g., zero or more, etc.) corresponding remediations.

The analysis of the information from the device manufacturers and other information sources may utilize various conventional or other techniques to identify the problems and remediations for the network devices. For example, learning module 22 (e.g., via one or more server systems 10) may parse the information and form hypotheses with respect to problems and corresponding remediations. The hypotheses are verified against evidence, and are assigned confidence levels. When the confidence level of a hypothesis exceeds a confidence threshold, the problem and/or remediations (corresponding to the hypothesis) are provided. The learning module basically employs machine learning to adjust confidence levels as new information is gathered (e.g., a site with increased posts of certain conditions for a problem may be assigned increasing confidence levels, etc.).

These tasks or functions may be performed based on conventional techniques of natural language processing (NLP), semantic analysis, information retrieval, automated reasoning, and machine learning. The learning module may further use various internal and external information sources to understand the information and form and verify hypotheses (e.g., web pages, data caches, databases, or other storage structures containing indexes, metadata, language rules, dictionaries, thesauri, encyclopedias, articles, literary works, etc.). By way of example, the learning module may include or communicate with a conventional system (e.g., IBM WATSON system, etc.) employing these types of techniques to identify problems and remediations.

Alternatively, learning module 22 (e.g., via one or more server systems 10) may determine the problems and remediations based on frequencies of occurrence of (or network sites providing) the problems and remediations. In particular, the learning module may analyze the information, and determine frequencies of occurrence within network sites. This may be accomplished by conventional natural language processing, semantic analysis, and other techniques, such as those described above. When the problems and/or remediations appear in a quantity of network sites that meets or exceeds a threshold, the problem and/or remediations are considered to be verified.

In addition, the risk module may determine the risk level for applying an identified remediation. Based on cognitive analysis of the information (e.g., chats, feedback from others that have tried the remediations, a volume of people that have tried the remediations, etc.) substantially similar to the analysis described above, a risk associated with applying the remediation may be determined. For example, the risk module may include or communicate with a conventional or other analytics system (e.g., IBM TRADEOFF ANALYTICS, etc.) to determine a risk level for a remediation. This type of system uses mathematical filtering to filter out less attractive remediation options and explore tradeoffs when considering various criteria. A decision inquiry with objectives and options (e.g., a user may specify decision criteria for the remediations including objectives and preferences, etc.) is provided as input. Optimal options for the remediations and the corresponding trade-offs are produced (e.g., with confidence levels, rankings, or other indicators, etc.) which can be converted to a numeric or other indication of the risk (e.g., confidence or risk percentage, numeric value within a range, etc.). This indication may be normalized to the corresponding scale for the remediation risk level provided by the user.

Alternatively, the risk level for a remediation may be based on uses of the remediation within the information. For example, a success (or failure) rate of a remediation may be determined from a quantity of successful (or failed) instances of the remediation relative to all occurrences of that remediation (e.g., a percentage of success (failure)/total remediation attempts). The success (or failure) rate may be normalized to the scale of the remediation risk level provided by the user. The learning and risk modules may continuously, periodically, and/or at some other time intervals (e.g., on command, a time interval specified by a user, configurable parameters, etc.) retrieve the information from the device manufacturer and/or other information sources to identify new problems and/or remediations (and corresponding risk levels for the remediations) for the network devices.

Once the problems and remediations for the network devices have been identified, readings or measurements from a network device are obtained (e.g., via security module 16 and one or more server systems 10) to identify readings indicating a potential issue or security risk with the network device at step 340. The readings or measurements may be associated with metrics, parameters, or other characteristics concerning network device output or operation (e.g., communications, power levels, memory usage, CPU usage, temperature, internal or external conditions, measured output produced by the network device, etc.).

Various readings may be determined to indicate a potential issue or security risk with the network device. For example, readings that may indicate a security risk include one or more readings from the network device outside standard levels or a normal range (e.g. analytics applied on data within a defined number of standard deviations based on other dimensional factors, such as time, weather, etc.), one or more readings from the network device outside a range of the network device, and/or one or more readings from the particular device outside a reliability level of that device or when device accuracy becomes questionable at extreme levels (e.g., some blood glucose meters do not operate well with less than twenty readings, certain devices do not operate well at certain temperatures/humidity, etc.). In addition, an external or environmental condition outside a recommended range may indicate a security risk.

The identified readings are compared with readings from other network devices at step 345 (e.g., via security module 16 and one or more server systems 10) to determine whether other network devices have the same types of readings, thereby indicating a security risk for those other devices. The comparison may utilize various approaches to determine the presence of a risk for the other devices (e.g., quantity or percentage of similar readings (e.g., within a difference limit) between the network and other device is beyond a threshold, quantity of abnormal readings of the network device is within a certain limit of quantities of abnormal readings of the other devices, etc.).

Further, data (or readings) from similar at-risk network devices used outside of the user domain (e.g., a user network, etc.) may be consolidated at server systems 10, and used to identify at-risk devices in the user domain. The network device readings may be compared to the consolidated readings to determine the presence of a security risk (e.g., quantity or percentage of similar readings (e.g., within a difference limit) between a user domain network device and consolidated readings is beyond a threshold, quantity of abnormal readings of the user domain network device is within a certain limit of quantities of abnormal readings of the consolidated readings, etc.). Moreover, all risk associated with the network devices and domains may be consolidated at the server systems and used to monitor or identify security risks at individual network devices and user domains (e.g., quantity or percentage of similar readings (e.g., within a difference limit) between the other device and consolidated readings is beyond a threshold, quantity of abnormal readings of the other device is within a certain limit of quantities of abnormal readings of the consolidated readings, etc.).

If the readings of the other devices are consistent with the identified or consolidated readings, a security risk is identified for the other devices and actions are performed on the other devices to rectify or remediate the security risk at step 350 in substantially the same manner described below. The actions may be based on identified remediations, the risk level for the remediations for the other devices, and/or the remediation risk level specified for the users and/or other devices as described below. If no remediations are identified or available (e.g., based on the remediation risk level, etc.) for the other network devices, the other network devices without identified remediations may be quarantined in substantially the same manner described below.

When the identified readings are not consistent with other devices as determined at step 345, or after remediations for the other devices are applied at step 350, the readings (and/or other information from the network device and learning module 22) are analyzed (e.g., via risk module 24 and one or more server systems 10) to determine security risks at step 355. The risk module performs a risk assessment using input from the device manufacturer and other information sources by analyzing risk based on the abnormal readings and the manner the abnormal readings have indicated problems of other devices. The risk module may include or communicate with a conventional or other analytics system (e.g., IBM TRADEOFF ANALYTICS, etc.) to determine a security risk. As described above, this type of system uses mathematical filtering to explore tradeoffs when considering various criteria. Candidates for problems (or security risks) based on the identified readings and the corresponding trade-offs are produced (e.g., with confidence levels, rankings, or other indicators, etc.) which can be converted to a numeric or other indication for each candidate. The indications for the candidates may be combined (e.g., a weighted average of the various candidates (e.g., or corresponding risk or confidence levels)) to produce an overall risk value for the identified readings. A probability of an incident based on analysis of others with similar devices may be determined by the risk module (e.g., based on the readings and occurrences of incidents with those other devices) and used to produce the overall risk value. The risk module may further determine a cost of using compromised data (e.g., inaccurate measurements or readings, etc.) provided by the network device which may be utilized to produce the overall risk value.

Alternatively, risk module 24 (e.g., via one or more server systems 10) may determine the security risks based on correlations of problems with the identified readings. In particular, the risk module may analyze information, and determine occurrence of problems associated with the identified readings within network sites. A quantity of network sites or instances where each determined problem and the identified readings are correlated may be used to determine a value for the security risk. A weighted average of the values (or quantities of network sites) for the determined problems may be used to produce the overall risk value.

The overall risk value may be produced in any desired scale, and normalized (or converted) to the corresponding scale for the problem risk level provided by the user (e.g., risk percentage normalized to a numeric or alphanumeric scale, etc.).

If the security risks have attained or exceeded the corresponding problem risk level for the user or device as determined at step 360, the user (or subscriber) is notified (e.g., via security module 16 and one or more server systems 10) of the security risks or problems and corresponding actions at step 365. The notification may indicate the security risks and corresponding remediations for the network device based on the user and/or device profile (e.g., security risks and remediations satisfying the configured problem and remediation risk levels for the device or user, all security risks and remediations, etc.). Thus, the actions (and security service) are tailored to the specific network device.

The security module may further assess remediations based on additional criteria (e.g., impacts of remediation on other network devices, etc.). For example, a remediation may be appropriate for a network device for an identified security risk. However, the remediation may be incompatible with and/or cause other devices to operate incorrectly (e.g., a software update may correct a first network device, but be incompatible with software versions of other network devices of the user (e.g., on the same network)). In this case, the security module may prevent the remediation from being suggested and/or applied.

The notification may simply provide notice of the security risks and remediations to enable the user to intervene to correct the identified problems (e.g., apply remediations, quarantine the device, etc.). Alternatively, the notification may enable the user to select the problems to address and/or the corresponding desired actions to be performed (e.g., remediations, indicate that the device should be quarantined etc.)). The actions may be performed automatically, or upon activation by the user from the notification. Further, the network device may be automatically quarantined in the absence of corresponding (e.g., identified, user-selected, etc.) remediations. The notification may be transmitted via any suitable communications (e.g., e-mail or other message, etc.).

If the actions include quarantining the network device (e.g., isolating the network device, etc.) or performing the remediations to alleviate the security risks as determined at step 370, the appropriate action is performed (e.g., via security module 16 and one or more server systems 10) at step 370 to quarantine the network device or remediate the security risks at step 375. For example, a quarantined device may be disabled and connected (or directed) to a service network or change service to evaluate the network device and make changes to the device (e.g., to remediate security risk issues). These changes may be based on the remediations identified by learning module 22 described above. Further, a quarantined device may be re-introduced into the computing environment or network after remediation. Moreover, the remediations satisfying the remediation risk levels and/or selected by the user may be applied to the network device (e.g., apply software patches, perform steps enumerated in posts, etc.).

When no actions are designated to be performed (e.g., no remediations/quarantines have been identified/selected or satisfy the remediation risk level, user declines remediations and quarantines, etc.) as determined at step 370, or after actions have been performed at step 375, the presence of new remediations to alleviate the security risks are determined at step 380. This may be based on learning module 22 and risk module 24 identifying new problems and/or remediations (and risks of the remediations) for the network device as described above. If new remediations are present (e.g., that satisfy the remediation risk level for the user or device, are selected by the user, etc.), these remediations are applied at step 375. The application of remediations are applied until no further remediations exist. The process continues to analyze the readings of the network device (e.g., from step 340) as described above, until the risks are alleviated or the security service terminates as determined at step 385.

By way of example, a user may register a network device in the form of a heart rate monitor. Rumors start appearing on network sites (e.g., web pages, etc.) that the heart rate monitor is calculating heart rate incorrectly when the environmental temperature is below a certain level (e.g., below freezing or 32° F.). A profile for this device indicates the user accepts a high level of risk (e.g., a high problem risk level and low remediation risk level (to apply only trusted remediations)), thereby preventing occurrence of remediation or quarantine based on the rumors (since the rumors are a low level risk). As more reports arise for this problem, the problem risk level increases from low to medium which is still insufficient to trigger a remediation. However, the device manufacturer reports a problem, and supplies a software fix (or patch) for the heart rate monitor. At this point, the problem risk level is increased to high, and the remediation is low risk (or trustworthy). Accordingly, the problem and remediation meet the problem and remediation risk levels, and the heart rate monitor is automatically updated with the software patch provided by the manufacturer.

It will be appreciated that the embodiments described above and illustrated in the drawings represent only a few of the many ways of implementing embodiments for providing security for devices connected to a network.

The environment of the present invention embodiments may include any number of computer or other processing systems (e.g., client or end-user systems, server systems, network devices, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, security module, learning module, risk module, etc.). These systems may include any types of monitors and input devices (e.g., keyboard, mouse, voice recognition, etc.) to enter and/or view information.

It is to be understood that the software (e.g., security module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client/network devices and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., security module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., ranges for device readings, user (or subscriber) information, security tolerances for users/devices, etc.)). The database system may be implemented by any number of any conventional or other databases, data stores or storage structures (e.g., files, databases, data structures, data or other repositories, etc.) to store information (e.g., ranges for device readings, user (or subscriber) information, security tolerances for users/devices, etc.). The database system may be included within or coupled to the server and/or client/network devices. The database systems and/or storage structures may be remote from or local to the computer or other processing systems, and may store any desired data (e.g., ranges for device readings, user (or subscriber) information, security tolerances for users/devices, etc.).

The present invention embodiments may employ any number of any type of user interface (e.g., Graphical User Interface (GUI), command-line, prompt, etc.) for obtaining or providing information (e.g., profiles, security risk tolerance, identified security risks, actions taken, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., identified security risks, actions taken, etc.).

The present invention embodiments are not limited to the specific tasks or algorithms described above, but may be utilized for providing security (e.g., including monitoring) to any types of devices connected to a network. The security may be provided in any fashion in any suitable mode (e.g., as an On Demand or other type of service, periodically applied, etc.). The devices may include any devices that may sense, collect, and/or provide data (e.g., a sensor (e.g., utility, medical, physiological, weather, alarm, external conditions, device internal conditions, meter, etc.), a device containing a sensor or otherwise collecting data, measurements, and/or readings (e.g., desktop or portable computer system, portable processing device, cellular telephone, appliance, vehicle, medical device, meters, exercise machine or device, etc.), etc.). The security device may include any suitable components (e.g., processor, memory, communications modules, etc.), be included within or coupled to a network device in any fashion (e.g., wired or wireless communication, network communication, etc.), and may monitor and transfer any desired information associated with a corresponding network device.

The user and device profiles may contain any suitable information (e.g., security risk tolerance levels, communication information, user information, device information, desired actions, etc.). The devices may be organized into any classes or groups based on any desired criteria (e.g., device type, manufacturer, etc.). The information to be analyzed for problems and remediations may be obtained from any desired information sources (e.g., documents, web or network pages, chats, blogs, posts, email or other messages, news articles, etc.). The information may be analyzed at any desired intervals (e.g. periodically, continuously, at certain times of day, etc.) to update problems and remediations.

Any quantity of any desired criteria or conditions may be applied to device readings or measurements to identify a potential security risk (e.g., abnormal ranges, readings from all devices, readings from similar devices, environmental conditions, internal device conditions, etc.). The risks may be determined in any suitable fashion based on any conventional or other techniques (e.g., statistical and/or filtering approaches, occurrence within web or network sites or other information, weighted approach, etc.). The risk and tolerance levels may be normalized to any common scale, and compared in any desired fashion to trigger actions (e.g., tolerance may be greater or less than a risk value to trigger an action or apply a remediation, etc.).

Any suitable actions may be applied to rectify an identified security risk (e.g., a remediation provided by a device manufacturer (e.g., software update/patch, etc.), a sequence of steps or operations to be performed, apply a service to diagnose and rectify the security risk, quarantine a network device, etc.). The actions may be applied automatically, or after selection and actuation by a user. A security risk may be associated with any types of malfunctions or irregularities of the network device (e.g., inaccurate or improper data being produced, operational defect, physical damage, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing security for a device from a security system comprising:
    monitoring a plurality of networked devices for a security risk, wherein each networked device is associated with a corresponding security risk tolerance for initiating actions to alleviate the security risk and a corresponding remediation risk tolerance indicating a risk level associated with performance of the actions to alleviate the security risk on that networked device;
    determining the actions to alleviate the security risk and the risk level for each determined action associated with performing that determined action on the plurality of networked devices to alleviate the security risk;
    determining that a monitored security risk for one or more of the plurality of networked devices exceeds the corresponding security risk tolerance;
    determining one or more of the determined actions to alleviate the monitored security risk with the risk level from performance satisfying the corresponding remediation risk tolerance for each of the one or more networked devices, wherein determining one or more of the determined actions includes identifying at least one new action for the determined actions that subsequently becomes available and has the risk level from performance satisfying the corresponding remediation risk tolerance for at least one networked device of the one or more networked devices when the risk level from performance of the determined actions fails to satisfy the corresponding remediation risk tolerance for the at least one networked device; and
    initiating at the security system a network service provided to the one or more networked devices to perform the determined one or more actions on each of the one or more networked devices to alleviate the monitored security risk.

2. The method of claim 1, wherein the monitored security risk includes one or more from a group of:
    a probability of an incident based on analysis of other similar devices; and
    a cost of utilizing compromised data.

3. The method of claim 1, wherein at least one of the plurality of networked devices includes an additional hardware module to monitor for the security risk.

4. The method of claim 1, wherein the determined one or more actions include one or more from a group of remediating the monitored security risk, and quarantining the one or more networked devices with the monitored security risk exceeding the corresponding security risk tolerance.

5. The method of claim 4, further comprising:
    evaluating and changing each quarantined device to alleviate the monitored security risk; and
    returning each changed quarantined device to a network to resume operation.

6. The method of claim 1, wherein the monitored security risk is based on one or more from a group of:
    readings for a networked device outside of a defined number of standard deviations;
    readings for a networked device outside of an operating range for that networked device; and
    an external condition outside of a reference range.

7. The method of claim 1, further comprising:
    consolidating data from other networked devices similar to a networked device of a user, and using the consolidated data to identify the networked devices with a security risk exceeding the corresponding security risk tolerance within a domain of the user.

8. The method of claim 1, further comprising:
    consolidating data from each of the plurality of networked devices, and using the consolidated data to identify the networked devices with a security risk exceeding the corresponding security risk tolerance.

9. A system of providing security for a device comprising:
    at least one hardware processor configured to:
        monitor a plurality of networked devices for a security risk, wherein each networked device is associated with a corresponding security risk tolerance for initiating actions to alleviate the security risk and a corresponding remediation risk tolerance indicating a risk level associated with performance of the actions to alleviate the security risk on that networked device;
        determine the actions to alleviate the security risk and the risk level for each determined action associated with performing that determined action on the plurality of networked devices to alleviate the security risk;

determine that a monitored security risk for one or more of the plurality of networked devices exceeds the corresponding security risk tolerance;

determine one or more of the determined actions to alleviate the monitored security risk with the risk level from performance satisfying the corresponding remediation risk tolerance for each of the one or more networked devices, wherein determining one or more of the determined actions includes identifying at least one new action for the determined actions that subsequently becomes available and has the risk level from performance satisfying the corresponding remediation risk tolerance for at least one networked device of the one or more networked devices when the risk level from performance of the determined actions fails to satisfy the corresponding remediation risk tolerance for the at least one networked device; and initiate at the system a network service provided to the one or more networked devices to perform the determined one or more actions on each of the one or more networked devices to alleviate the monitored security risk.

10. The system of claim 9, wherein the determined one or more actions include one or more from a group of remediating the monitored security risk, and quarantining the one or more networked devices with the monitored security risk exceeding the corresponding security risk tolerance.

11. The system of claim 9, wherein the monitored security risk is based on one or more from a group of:
readings for a networked device outside of a defined number of standard deviations;
readings for a networked device outside of an operating range for that networked device; and
an external condition outside of a reference range.

12. The system of claim 9, wherein the at least one hardware processor is further configured to:
consolidate data from the plurality of networked devices, and use the consolidated data to identify the networked devices with a security risk exceeding the corresponding security risk tolerance.

13. A computer program product for providing security for a device from a security system, the computer program product comprising one or more computer readable storage media collectively having computer readable program code embodied therewith, the computer readable program code executable by at least one processor of the security system to cause the at least one processor to:
monitor a plurality of networked devices for a security risk, wherein each networked device is associated with a corresponding security risk tolerance for initiating actions to alleviate the security risk and a corresponding remediation risk tolerance indicating a risk level associated with performance of the actions to alleviate the security risk on that networked device;
determine the actions to alleviate the security risk and the risk level for each determined action associated with performing that determined action on the plurality of networked devices to alleviate the security risk;
determine that a monitored security risk for one or more of the plurality of networked devices exceeds the corresponding security risk tolerance;
determine one or more of the determined actions to alleviate the monitored security risk with the risk level from performance satisfying the corresponding remediation risk tolerance for each of the one or more networked devices, wherein determining one or more of the determined actions includes identifying at least one new action for the determined actions that subsequently becomes available and has the risk level from performance satisfying the corresponding remediation risk tolerance for at least one networked device of the one or more networked devices when the risk level from performance of the determined actions fails to satisfy the corresponding remediation risk tolerance for the at least one networked device; and
initiate at the security system a network service provided to the one or more networked devices to perform the determined one or more actions on each of the one or more networked devices to alleviate the monitored security risk.

14. The computer program product of claim 13, wherein the monitored security risk includes one or more from a group of:
a probability of an incident based on analysis of other similar devices; and
a cost of utilizing compromised data.

15. The computer program product of claim 13, wherein at least one of the plurality of networked devices includes an additional hardware module to monitor for the security risk.

16. The computer program product of claim 13, wherein the determined one or more actions include one or more from a group of remediating the monitored security risk, and quarantining the one or more networked devices with the monitored security risk exceeding the corresponding security risk tolerance.

17. The computer program product of claim 16, wherein the computer readable program code is further configured to cause the at least one processor to:
evaluate and change each quarantined device to alleviate the monitored security risk; and
return each changed quarantined device to a network to resume operation.

18. The computer program product of claim 13, wherein the monitored security risk is based on one or more from a group of:
readings for a networked device outside of a defined number of standard deviations;
readings for a networked device outside of an operating range for that networked device; and
an external condition outside of a reference range.

19. The computer program product of claim 13, wherein the computer readable program code is further configured to cause the at least one processor to:
consolidate data from other networked devices similar to a networked device of a user, and use the consolidated data to identify the networked devices with a security risk exceeding the corresponding security risk tolerance within a domain of the user.

20. The computer program product of claim 13, wherein the computer readable program code is further configured to cause the at least one processor to:
consolidate data from each of the plurality of networked devices, and use the consolidated data to identify the networked devices with a security risk exceeding the corresponding security risk tolerance.

* * * * *